United States Patent
Tsunemi et al.

(10) Patent No.: US 11,541,933 B2
(45) Date of Patent: Jan. 3, 2023

(54) AUTOMOTIVE STRUCTURAL MEMBER

(71) Applicant: NIPPON STEEL CORPORATION, Tokyo (JP)

(72) Inventors: Yusuke Tsunemi, Tokyo (JP); Masahiko Abe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 307 days.

(21) Appl. No.: 17/044,716

(22) PCT Filed: Apr. 9, 2019

(86) PCT No.: PCT/JP2019/015519
§ 371 (c)(1),
(2) Date: Oct. 1, 2020

(87) PCT Pub. No.: WO2019/198729
PCT Pub. Date: Oct. 17, 2019

(65) Prior Publication Data
US 2021/0031835 A1 Feb. 4, 2021

(30) Foreign Application Priority Data
Apr. 9, 2018 (JP) .............................. JP2018-074647

(51) Int. Cl.
*B62D 21/15* (2006.01)
*B62D 29/00* (2006.01)
*B62D 29/04* (2006.01)

(52) U.S. Cl.
CPC .......... *B62D 21/15* (2013.01); *B62D 29/043* (2013.01); *B62D 29/001* (2013.01)

(58) Field of Classification Search
CPC .... B62D 21/15; B62D 21/152; B62D 25/025; B62D 25/2036; B62D 29/001; B62D 29/005; B62D 29/043
See application file for complete search history.

(56) References Cited

U.S. PATENT DOCUMENTS 6,217,109 B1 * 4/2001 Okana .................. B62D 25/025
296/203.03
2016/0236715 A1 * 8/2016 Kurokawa ............. B62D 21/15
(Continued)

FOREIGN PATENT DOCUMENTS

DE 10 2012 000 458 A1 9/2012
DE 10 2013 018 631 A1 5/2014
(Continued)

*Primary Examiner* — Gregory A Blankenship
(74) *Attorney, Agent, or Firm* — Birch, Stewart, Kolasch & Birch, LLP

(57) ABSTRACT

In an automotive structural member, weight efficiency of impact resistance is improved. An automotive structural member includes: a hollow member having plane portions; and an FRP member joined to at least one section of the plane portions, wherein: the FRP member is joined to a region of at least 0.1L1 to 0.9L1 of a length L1 in a longitudinal direction of the hollow member; the plane portion is formed with an FRP joint portion being a portion to which the FRP member is joined and an FRP non-joint portion being a portion to which the FRP member is not joined, in the region of 0.1L1 to 0.9L1; a total width of the FRP joint portion is 8 to 60% of a full width of the plane portion, in the plane portion; and a flexural rigidity of the FRP member in the FRP joint portion is 30 times or more a flexural rigidity of the plane portion excluding the FRP member in the plane portion.

9 Claims, 9 Drawing Sheets

(56) References Cited

U.S. PATENT DOCUMENTS

| | | | |
|---|---|---|---|
| 2017/0029040 A1* | 2/2017 | Meaige | B62D 25/04 |
| 2018/0001525 A1* | 1/2018 | Imamura | B29C 45/14065 |
| 2019/0039653 A1* | 2/2019 | Otsuka | B62D 25/00 |
| 2019/0144047 A1* | 5/2019 | Belpaire | B62D 27/026 |
| | | | 296/202 |
| 2019/0203754 A1* | 7/2019 | Meaige | F16B 11/006 |
| 2019/0283805 A1* | 9/2019 | Kurokawa | B62D 21/02 |
| 2019/0367098 A1* | 12/2019 | Miyake | B62D 29/005 |
| 2020/0047449 A1* | 2/2020 | Ayuzawa | B62D 29/008 |
| 2020/0180699 A1* | 6/2020 | Hirose | B62D 25/04 |
| 2020/0198703 A1* | 6/2020 | Hirose | B62D 25/08 |
| 2021/0031835 A1* | 2/2021 | Tsunemi | B62D 29/005 |
| 2021/0163079 A1* | 6/2021 | Mersmann | B62D 29/043 |
| 2021/0276630 A1* | 9/2021 | Aitoh | B62D 25/08 |
| 2022/0081033 A1* | 3/2022 | Higai | B62D 29/005 |
| 2022/0081038 A1* | 3/2022 | Higai | B62D 25/00 |
| 2022/0089223 A1* | 3/2022 | Higai | B62D 21/15 |
| 2022/0258804 A1* | 8/2022 | Higai | B62D 29/007 |

FOREIGN PATENT DOCUMENTS

| | | |
|---|---|---|
| JP | 6-101732 A | 4/1994 |
| JP | 2014-233999 A | 12/2014 |
| JP | 2015-112898 A | 6/2015 |
| JP | 2015-160524 A | 9/2015 |
| JP | 2017-61068 A | 3/2017 |
| JP | 2018-34664 A | 3/2018 |

\* cited by examiner

AUTOMOTIVE STRUCTURAL MEMBER

CROSS-REFERENCE TO RELATED APPLICATIONS

This application is based upon and claims the benefit of priority of the prior Japanese Patent Application No. 2018-074647, filed in Japan on Apr. 9, 2018, the entire contents of which are incorporated herein by reference.

TECHNICAL FIELD

The present invention relates to an automotive structural member.

BACKGROUND ART

An automotive structural member demands impact resistance for protecting occupants at a time of collision. For example, a floor cross member as illustrated in FIG. 1 demands the impact resistance at the time of side collision, and a floor tunnel and a side sill demand the impact resistance at the time of front collision and at the time of rear collision. Further, a front side member is constituted of a front side member front and a front side member rear, and the front side member rear demands the impact resistance at the time of the front collision. In order to further enhance collision safety of an automobile, it is important to improve the impact resistance of the respective structural members.

As a technique of improving the impact resistance, Patent Document 1 discloses a floor cross member formed of a hat-shaped member joined on a vehicle-interior side of a floor panel and a U-shaped member joined to an upper portion of the hat-shaped member. In the floor cross member in Patent Document 1, an impact load input at a time of side collision of an automobile is dispersed and transmitted to the hat-shaped member and the U-shaped member, thereby improving the impact resistance.

Further, Patent Document 2 discloses an impact absorbing member having a composite structure in which an FRP member (high-strength lightweight material) is joined to a hollow frame (impact absorber) made of an aluminum alloy. The technique described in Patent Document 2 discloses a formation in which the FRP member is joined about 100% in a longitudinal direction of the hollow frame, and this makes an impact energy absorbing function and a deformation preventing function compatible with each other.

Further, Patent Document 3 discloses a technique of bonding a reinforcing material made of a CFRP to a wall portion of a hollow frame made of metal. In the technique described in Patent Document 3, pasting the reinforcing material on only a position on which a tensile load concentrates makes reduction in weight and load resistance compatible with each other.

Further, Patent Document 4 discloses a metal-CFRP composite member put to practical use for an automobile member. The technique described in Patent Document 4 can reduce a residual shear stress of a thermosetting adhesive for bonding a reinforcing material (CFRP).

In addition, Patent Document 5 discloses a vehicle body manufacturing method of reinforcing a vehicle body member of an automobile by using a patch made of a CFRP. In the technique described in Patent Document 5, pasting or bolting the patch on a tensile surface of a stress concentration portion makes it possible to increase a reinforcing effect and easily adjust the size of the reinforcing effect.

PRIOR ART DOCUMENT

Patent Document

[Patent Document 1] Japanese Laid-open Patent Publication No. 2015-112898
[Patent Document 2] Japanese Laid-open Patent Publication No. H06-101732
[Patent Document 3] Japanese Laid-open Patent Publication No. 2015-160524
[Patent Document 4] Japanese Laid-open Patent Publication No. 2017-61068
[Patent Document 5] Japanese Laid-open Patent Publication No. 2014-233999

DISCLOSURE OF THE INVENTION

Problems to be Solved by the Invention

The automotive structural member demands improvement in impact resistance, while it also demands reduction in vehicle body weight for fuel consumption improvement. For this purpose, at the viewpoint of making the impact resistance and the reduction in weight as the structural member compatible with each other, it is desired to improve weight efficiency of the impact resistance which serves as an index indicating the impact resistance per unit weight. However, the floor cross member in Patent Document 1 is required to be formed so as to use the hat-shaped member, the U-shaped member, and so on and have two closed sections in a height direction, which therefore causes significant increase in the weight with respect to a degree of the improvement in impact resistance, resulting in reducing the weight efficiency of the impact resistance.

Further, the above Patent Document 2 discloses the formation in which the FRP member is joined about 100% in the longitudinal direction of the hollow frame, but there is room for giving a further idea to the joint section of the FRP member, and further improvement in the weight efficiency is demanded in order to make the impact resistance and the reduction in weight compatible with each other. Further, the above Patent Document 3 describes that the reinforcing material is pasted on only the position on which the tensile load concentrates, but there is no reference to a composition of a suitable reinforcing material regarding the impact resistance, and a further idea is demanded in order to make the impact resistance and the reduction in weight compatible with each other.

Further, the above Patent Document 4 indicates the technique of reducing the residual shear stress of the thermosetting adhesive for bonding the reinforcing material (CFRP), and the above Patent Document 5 indicates the technique of performing the reinforcement by pasting or bolting the patch on the tensile surface of the stress concentration portion, but neither of these documents can be said to sufficiently refer to a suitable bonding position of the FRP member and an improvement technique of the weight efficiency accompanying the impact resistance, and there is room for further improvement.

The present invention has been made in consideration of the above circumstances, and an object thereof is to improve weight efficiency of impact resistance in an automotive structural member.

Means for Solving the Problems

In order to solve the above problems, according to the present invention, there is provided an automotive structural member, the automotive structural member including: a hollow member having plane portions; and an FRP member joined to at least one section of the plane portions, wherein: the FRP member is joined to a region of at least 0.1L to 0.9L of a length L in a longitudinal direction of the hollow member; the plane portion is formed with an FRP joint portion being a portion to which the FRP member is joined and an FRP non-joint portion being a portion to which the FRP member is not joined, in the region of 0.1L to 0.9L; a total width of the FRP joint portion is 8 to 60% of a full width of the plane portion, in the plane portion; and a flexural rigidity of the FRP member in the FRP joint portion is 30 times or more a flexural rigidity of the plane portion excluding the FRP member in the plane portion.

A flexural rigidity of the FRP member may be 100 times or more a flexural rigidity of the plane portion excluding the FRP member.

A thickness of the FRP member may be six times or more a thickness of the plane portion.

Each width D of the FRP non-joint portions in the plane portion may satisfy a following formula (1).

[Mathematical formula 1]

$$0.5 \times 1.9 \times t \times \sqrt{\frac{E}{\sigma y}} \leq D \leq 1.6 \times 1.9 \times t \times \sqrt{\frac{E}{\sigma y}} \quad (1)$$

Here, t: a thickness of the plane portion, E: a Young's modulus of the plane portion, $\sigma_y$: a yield stress of the plane portion The FRP member may be joined to a surface on an inner space side of the hollow member.

The FRP member may be a CFRP member composed of a CFRP.

The FRP member may be a GFRP member composed of a GFRP.

Fibers in which a fiber direction of the CFRP member is in a range within ±5° to a longitudinal direction of the CFRP member may be 80% or more of all fibers.

The above-described automotive structural member may be at least any member of a floor cross member, a floor tunnel, a front side member rear, and a side sill.

Note that the automotive structural member according to the present invention does not include a structural member in which the FRP member is joined over the plane portions of the hollow member.

Effect of the Invention

According to the present invention, it is possible to improve weight efficiency of impact resistance in an automotive structural member.

EMBODIMENTS FOR CARRYING OUT THE INVENTION

Figure 1:
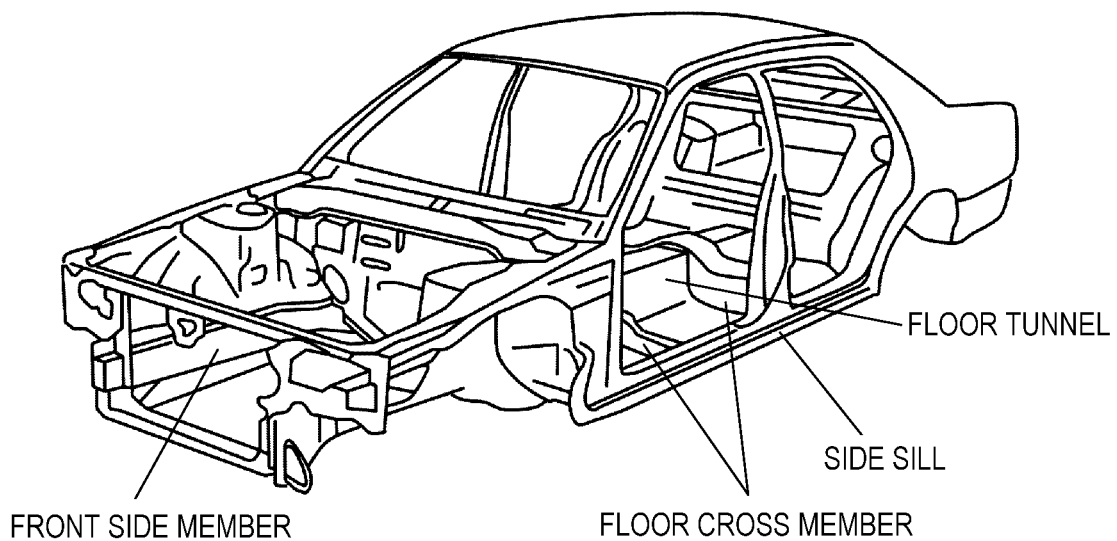
FIG. 1 is a view illustrating a vehicle body structure of a typical automobile.

Hereinafter, an embodiment of the present invention will be explained while referring to the drawings. Note that in this description and the drawings, elements having substantially the same functional configuration are denoted by the same codes to omit duplicated explanation.

Figure 2:
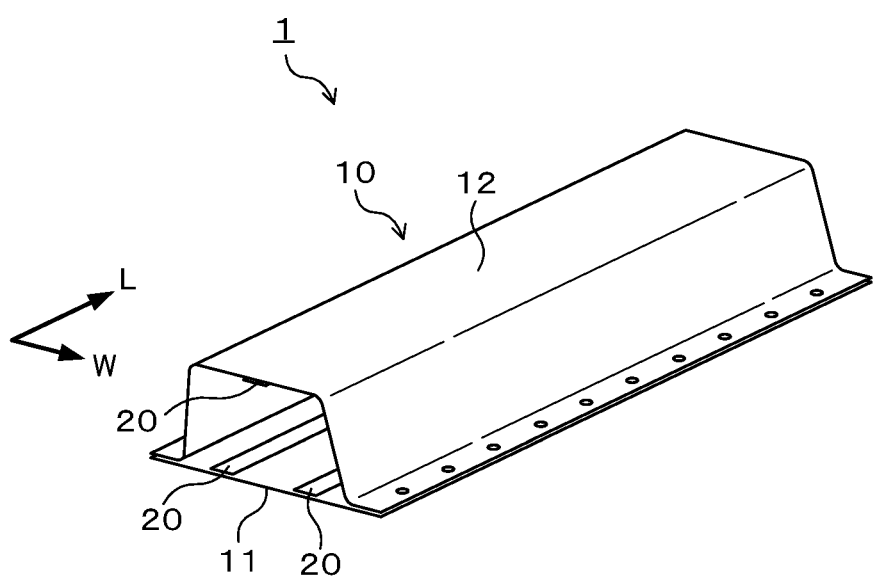
FIG. 2 is a perspective view illustrating a schematic configuration of a structural member according to an embodiment of the present invention.
Figure 3:
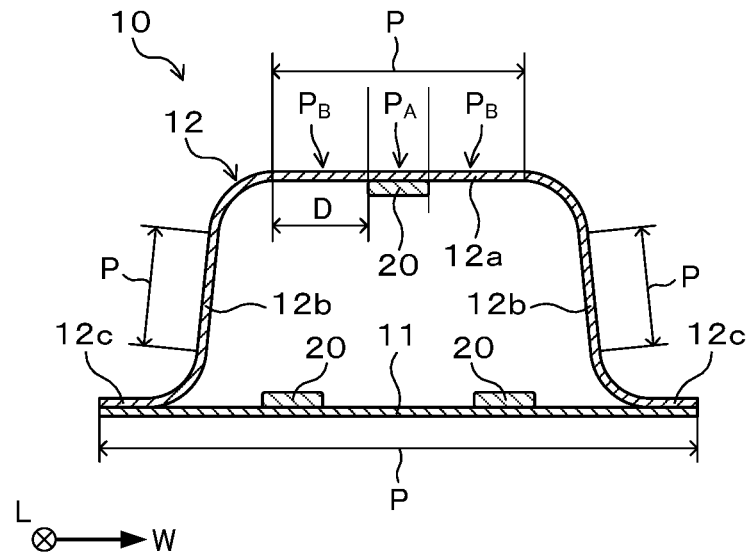
FIG. 3 is a sectional view when the structural member according to the embodiment of the present invention is cut vertically to a longitudinal direction of a hollow member.

An automotive structural member 1 (hereinafter, also simply called "structural member 1") of this embodiment is constituted of a hollow member 10 and FRP members 20 composed of, for example, a CFRP (carbon fiber reinforced plastic) which are each joined to the hollow member 10 as illustrated in FIG. 2 and FIG. 3. The resin, the reinforced fibers, and the like composing the FRP member 20 are described later. Note that both end portions in a longitudinal direction L of the hollow member 10 are each in an open state in this embodiment, but the opening may be covered with another flat sheet (not illustrated) or the like. For example, as long as the structural member 1 is a floor cross member, the other flat sheet is a wall portion of another member such as a side sill or a floor tunnel which is joined to an end portion of the floor cross member.

The hollow member 10 is formed of a flat sheet 11 and a member in which a shape in a vertical cross section to the longitudinal direction L of the hollow member 10 is a hat shape (hereinafter, "hat-shaped member 12"). A raw material of the flat sheet 11 and the hat-shaped member 12 is not particularly limited, and for example, a steel sheet or an aluminum sheet is used. Note that in this description, a long-range direction in which a closed section of the hollow member 10 in plan view of the structural member 1 extends is called the longitudinal direction L of the member, and a vertical direction to the longitudinal direction L in plan view is called a "width direction W". Further, in a surface of the flat sheet 11, a surface on a side opposing to the hat-shaped member 12, namely, a surface on an inner space side of the hollow member 10 is called an "inner surface", and a surface on the opposite side is called an "outer surface". Further, in a surface of the hat-shaped member 12, a surface on the inner space side of the hollow member 10 is called an "inner surface", and a surface of the opposite side is called an "outer surface".

The hat-shaped member 12 has a top sheet portion 12a, vertical wall portions 12b extending from both end portions in the width direction W of the top sheet portion 12a and inclined to the top sheet portion 12a, and flange portions 12c extending from tip portions of the vertical wall portions 12b to the outside in the width direction W as illustrated in FIG. 3. The FRP members 20 of this embodiment are joined at two sections on the inner surface of the flat sheet 11 and one section on the inner surface of the top sheet portion 12a of the hat-shaped member 12 as illustrated in FIG. 2 and FIG. 3. The FRP members 20 joined to the flat sheet 11 are disposed apart from each other, and the FRP member 20 joined to the hat-shaped member 12 is joined to a plane portion P of the top sheet portion 12a. Each of the FRP members 20 extends along the longitudinal direction L of the hollow member 10, and continuously extends from one end portion to the other end portion in the longitudinal direction L of the hollow member 10 in this embodiment, but in the viewpoint of improving weight efficiency, a length in the longitudinal direction L of the FRP member 20 only needs to be 80% or more of a length L1 in the longitudinal direction L of the hollow member 10. Concretely, the FRP members 20 are each required to be joined to a region of at least 0.1L1 to 0.9L1 in the longitudinal direction L in a case of setting the length in the longitudinal direction L of the hollow member 10 as L1. That is, the FRP members 20 are each required to be joined up to a region apart by distances of 40% of the length L1 from the center to both two end directions in the long direction of the hollow member. This is because, normally, the longitudinal-direction both end portions of the hollow member 10 are connected with other members to be in a constraint state, and thus at both end portions in setting the length in the longitudinal direction L of the hollow member 10 as L1 (0 to 0.1L1 and 0.9L1 to 1.0L1), namely at regions from both ends to 10% of the length L1, impact resistance is secured even though the FRP members 20 are not necessarily joined thereto. Further, a longitudinal direction of the FRP member 20 is preferably in a range of not less than −10° nor more than 10° (within ±10°) with respect to the longitudinal direction L of the hollow member 10. The above-described angle is more preferably within −5° to +5° (within ±5°).

Note that in the hat-shaped member 12 of this embodiment, because the top sheet portion 12a and the vertical wall portions 12b are connected with each other by curved surfaces, the end portions in the width direction W of the top sheet portion 12a include the curved surfaces, and the "plane portion" of a member including the plane and the curved surfaces in this description may mean boundary portions between the plane and the curved surfaces, namely, a portion from an R end of one curved surface to an R end of the other curved surface. According to this definition, the plane portions P of the vertical wall portions 12b of the hat-shaped member 12 are each set to be a portion from the R end of the curved surface on the top sheet portion 12a side to the R end of the curved surface on the flange portion 12c side. Further, as a more detailed definition of the "plane portion", when a sheet thickness of the member (the top sheet portion 12a, the vertical wall portions 12b, or the like) is set as t, and a curvature radius is set as r, $r/t \geq 10000$ may be defined as the plane portion P. Since the surface of the flat sheet 11 is also naturally the plane portion P, all of the FRP members 20 used in this embodiment are provided on the inner surfaces of the plane portions P of the hollow member 10. Note that as indicated in a later-described example, the hollow member 10 need not have a curved surface portion, and may be formed by only the plane portion.

The joining method of the FRP member 20 to the plane portion P is not particularly limited, and for example, it is joined by being pasted on the plane portion P by using a well-known adhesive. For this reason, the structural member 1 is manufactured by the flat sheet 11 in a state where the FRP members 20 are pasted on the surface by using the adhesive and the hat-shaped member 12 in a state where the FRP member 20 is pasted on the inner surface of the plane portion P of the top sheet portion 12a by using the adhesive being joined to each other by a well-known joining means such as spot welding at the flange portions 12c of the hat-shaped member 12, for example. However, the manufacturing method of the structural member 1 is not limited to the above-described method. Note that by observing a cross section of the structural member 1 in which the FRP members 20 are pasted on the plane portions P of the hollow member 10 by using the adhesive, the presence of the adhesive between the plane portions P of the hollow member 10 and the FRP members 20 can be confirmed. A concrete example of the joining method of the plane portion P and the FRP member 20 is described later.

The automotive structural member 1 of this embodiment is constituted as described above. According to the structural member 1 of this embodiment, joining the FRP members 20 to the plane portions P of the hollow member 10 makes flexural rigidity with respect to an out-of-plane deformation in the plane portions P large, and allows the occurrence of a buckling phenomenon at a time of an impact load input to be restrained. This enables improvement in the impact resistance as the structural member 1.

Figure 4:
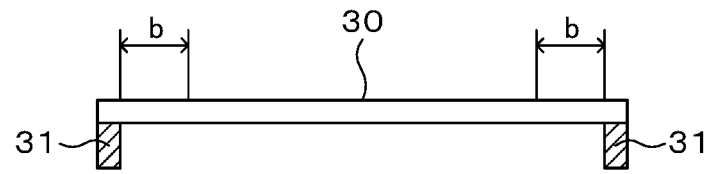
FIG. 4 is a view comparing a top sheet portion of a hat-shaped member in a conventional structural member to a support structure of a sheet.
Figure 5:
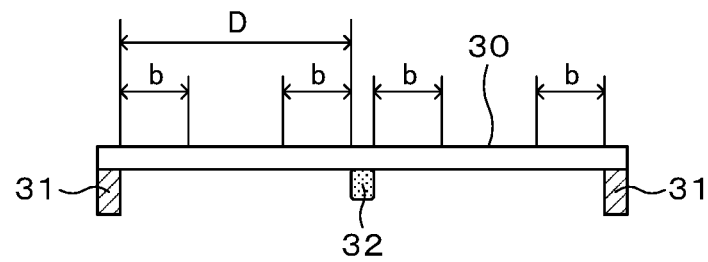
FIG. 5 is a view comparing a top sheet portion of a hat-shaped member in the structural member according to the embodiment of the present invention to a support structure of a sheet.

Here, a mechanism to improve the impact resistance as described above will be explained. FIG. 4 is a view comparing the top sheet portion 12a of the hat-shaped member 12 in a conventional structural member to a support structure of a sheet 30, and schematically illustrates a cross section of a surface including the width direction W of the structural member. FIG. 5 is a view comparing the top sheet portion 12a of the hat-shaped member 12 in the structural member 1 of this embodiment to a support structure of the sheet 30, and schematically illustrates a cross section of a surface including the width direction W of the structural member 1. As illustrated in FIG. 4, both end portions of the sheet 30 are each in a simple support state owing to support points 31 (corresponding to the vertical wall portions 12b of the hat-shaped member 12) in the conventional structural member, but a middle portion of the sheet 30 is not supported. For this reason, a portion to affect buckling strength, what is called, a range of effective widths b is only the vicinity of both end portions of the sheet 30. Here, the "effective width b" in this description is an effective width calculated by a formula of von Karman and the one called regarding compressive yield strength of a flat sheet whose both edges are simple-supported.

On the other hand, in the structural member 1 of this embodiment, since joining the FRP member 20 to the middle of the plane portion P of the top sheet portion 12a increases the flexural rigidity at the joining portion, when a comparison is made to the support structure of the sheet 30 as in FIG. 5, such a state that a new simple support point 32 is provided at a middle portion of the sheet 30 is obtained. That is, both end portions and the middle portion of the sheet 30 are each in the simple support state, and a range of the effective widths b is increased in contrast to the conventional structural member, resulting in improving the buckling strength. This improves the impact resistance of the structural member 1. Further, in comparison with a case of reinforcing the hollow member 10 by using a reinforcing member composed of a conventional metal member such as steel sheet, since increase in weight can be restricted, it is possible to improve the weight efficiency of the impact resistance in contrast to a structural member not provided with the FRP member 20.

Here, in this description, for example, as illustrated in FIG. 3, a portion to which the FRP member 20 is joined on the plane portion P is called an "FRP joint portion $P_A$". This FRP joint portion $P_A$ is the concept of including the plane portion P of the portion to which the FRP member 20 is joined, and the FRP member 20 which is joined to the portion. Further, a portion to which the FRP member 20 is not joined on the plane portion P, namely, a portion except the FRP joint portion $P_A$ is called an "FRP non-joint portion $P_B$".

In order that the FRP joint portion $P_A$ approaches the simple support state as described above, a ratio of the flexural rigidity of the FRP member 20 in the FRP joint portion $P_A$ and the flexural rigidity of a portion excluding the FRP member 20 in the FRP joint portion $P_A$, namely, the plane portion P in the FRP joint portion $P_A$ (hereinafter, "flexural rigidity ratio") is required to be 30 or more. As long as the FRP member 20 having such flexural rigidity as to satisfy this condition is joined to the plane portion P of the hollow member 10, the impact resistance can be improved, and the weight efficiency of the impact resistance can be made equal to or more than that of a member not provided with the FRP member 20. The flexural rigidity ratio is more preferably 50 or more, 80 or more, 100 or more, 150 or more, 200 or more, or 300 or more. The larger the flexural rigidity ratio is, the more the weight efficiency is improved, and therefore, an upper limit of the flexural rigidity is not particularly limited, and for example, it can be appropriately determined depending on other factors such as design conditions and costs of the structural member 1. Among some factors, in consideration of adhesive strength of an FRP curved member, it is more preferable to avoid making the flexural rigidity ratio too high, and concretely the flexural rigidity ratio is preferably set to 50000 or less. As needed, the flexural rigidity ratio may be set to 20000 or less, 10000 or less, 5000 or less, 1000 or less, or 500 or less.

Here, the flexural rigidity of the FRP member 20 can be found as a product IE of a second moment of area I which can be calculated from a shape of the FRP member 20 and an elastic modulus E, found from a tensile test at ordinary temperature in the longitudinal direction L of the hollow member 10, of the FRP member 20, in a vertical transverse section of the hollow member 10. The second moment of area I calculated from the shape of the FRP member 20 is parallel to a bonding surface (a surface bonded to the plane portion P) of the hollow member 10, and is calculated by the following formula (2) in a coordinate system in which a straight line passing through a centroid (barycentric position) of the FRP member 20 is set as the origin, a vertical direction on the bonding surface is set as a y axis, and a long direction of the FRP member and a vertical direction to the y-axis direction are set as an x axis. Note that A in the formula (2) represents a cross section. A cross-sectional shape of the FRP member 20 is preferably uniform, but when the cross-sectional shape is changed, a minimum value of a second moment of area is set as a second moment of area of the FRP member 20.

[Mathematical formula 2]

$$I=\int_A y^2 dA \tag{2}$$

A second moment of area $I_O$ of the plane portion P is calculated by the above formula (2) in a coordinate system in which a vertical surface in a sheet thickness direction which passes through the center of the sheet thickness of the plane portion is set as a reference, a vertical direction to the reference surface is set as a y axis, and the longitudinal direction L of the hollow member 10 and a vertical direction to a y-axis direction are set as an x axis. The flexural rigidity of the plane portion P can be found as a product $I_O E_O$ of a second moment of area $I_O$ of the plane portion P and an elastic modulus $E_O$, found from a tensile test at ordinary temperature in the longitudinal direction L of the plane portion P, of the plane portion P. Accordingly, the above-mentioned flexural rigidity ratio can be found as $IE/I_O E_O$. Note that regarding the elastic modulus $E_O$ of the plane portion P and the elastic modulus E of the FRP member 20, the above-described tensile tests are omitted, and elastic moduli of the corresponding raw materials which are described in well-known documents may be used.

In the support structure of the sheet 30 as in FIG. 5, in order to make reduction in weight and improvement in the buckling strength of the hollow member 10 compatible with each other, a total width of the FRP joint portion $P_A$ is required to be set to 8 to 60% of a full width of the plane portion P. When the total width of the FRP joint portion $P_A$ is more than 60% of the full width of the plane portion P, a weight reduction effect corresponding to an improvement effect of the buckling strength cannot be obtained. On the other hand, when the total width of the FRP joint portion $P_A$ is less than 8% of the full width of the plane portion P, this is because there is a possibility that the improvement effect of the buckling strength corresponding to an increase in weight caused by the FRP member 20 cannot be obtained. As needed, an upper limit of this ratio (total width of FRP joint portion $P_A$/full width of plane portion P) may be set to 50%, 40%, 30%, or 20%, and a lower limit of this ratio may be set to 10%, 12%, or 14%. In order to achieve the reduction in weight and the improvement in the buckling strength of the hollow member 10 together, an interval between the adjacent simple support points 31, 32 is preferably in a range of 0.5 to 1.6 times the effective width b. That is, a width D of the FRP non-joint portion $P_B$ is preferably in a range of 0.5 to 1.6 times the effective width b calculated by the formula of von Karman. Accordingly, the FRP member 20 is preferably provided so that each width D of the FRP non-joint portions $P_B$ satisfies the following formula (1). This enables the improvement in the impact resistance. Note that from the viewpoint of the weight efficiency, since a larger value of the width D of the FRP non-joint portion $P_B$ further reduces weight, a maximum value of the width D satisfying the following formula (1) is more preferable. As needed, a lower limit of the width D may be set to 0.6 times, 0.7 times, or 0.8 times the effective width b, and an upper limit of the width D may be relaxed to 2.5 times or 2.0 times, or may be set to 1.5 times, 1.4 times, 1.3 times, or 1.2 times.

[Mathematical formula 3]

$$0.5 \times 1.9 \times t \times \sqrt{\frac{E}{\sigma_y}} \leq D \leq 1.6 \times 1.9 \times t \times \sqrt{\frac{E}{\sigma_y}} \qquad (1)$$

Here, t: a thickness of the plane portion, E: a Young's modulus of the plane portion, $\sigma_y$: a yield stress of the plane portion Note that each width D of the FRP non-joint portions $P_B$ is an interval in the width direction W between the FRP members 20 adjacent to each other in a case of the presence of the adjacent FRP members 20, and is also a distance in the width direction from the FRP member 20 (here, a position closest to an end portion of the plane portion P on the bonding surface) to the end portion of the plane portion P in a case of the absence of the adjacent FRP members 20. That is, the interval in the width direction W between the FRP members 20 adjacent to each other and the distance in the width direction from the FRP member 20 (here, a position closest to an end portion of the plane portion P on the bonding surface) to the end portion of the plane portion P preferably satisfy the above-described formula (1).

Further, a thickness of the FRP member 20 is preferably six times or more a thickness of the plane portion P to which the FRP member 20 is joined. It may be set to be four times or more, eight times or more, or ten times or more the thickness of the plane portion P. An upper limit of the thickness of the FRP member 20 need not be particularly fixed, but may be set to be 15 times or less or 20 times or less the thickness of the plane portion P. This makes the weight efficiency of the impact resistance high, and makes a degree of the improvement in the impact resistance with respect to as much as the increase in the weight large. The upper limit of the thickness of the FRP member 20 is not particularly limited, and fixed according to the weight, costs, a space in a joint section, and the like. Note that as the FRP member 20, even in any case such as to use an FRP member composed of a CFRP or various FRPs other than it, as long as the thickness of the FRP member is six times or more the thickness of the plane portion P to which the FRP is joined, the degree of the improvement in the impact resistance with respect to as much as the increase in the weight can be securely increased. A width of the FRP member 20 is appropriately changed depending on other factors such as a width of the plane portion P, the number of FRP members 20 which are joined to the plane portion P, design conditions and costs of the structural member 1, and for example, 5 to 15 mm.

As described above, according to the automotive structural member 1 of this embodiment, by joining the FRP members 20 to the plane portions P of the hollow member 10, the weight efficiency of the impact resistance of the structural member 1 can be improved. Such a structural member 1 is preferably used as a member at a section where axial force acts at the time of collision among members constituting a vehicle body of an automobile. For example, the structural member 1 is preferably used as at least any member of a floor cross member, a floor tunnel, a front side member rear, and a side sill.

Moreover, an amount of the FRP member 20 to an extent of being used for the structural member 1 as described in this embodiment does not cause impurities of steel to be excessively increased even though the structural member 1 in a state where the FRP member 20 is joined is melted. Accordingly, the structural member 1 as described in this embodiment is not required for the hollow member 10 and the FRP member 20 to be separated from each other in reusing the structural member 1 as scrap, resulting in being excellent in recyclability.

The embodiment of the present invention has been explained above, but, the present invention is not limited to such an example. It should be understood that various changes or modifications are readily apparent to those skilled in the art within the technical scope of the spirit as set forth in claims, and those should also be covered by the technical scope of the present invention.

Figure 6:
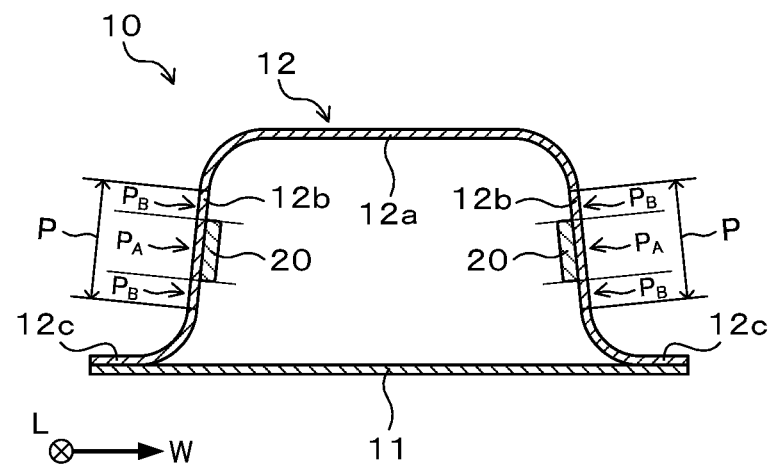
FIG. 6 is a sectional view illustrating a schematic configuration of a structural member according to another embodiment of the present invention.

For example, in the above-described embodiment, the FRP members 20 are joined at the two sections on the inner surface of the flat sheet 11 and the one section on the inner surface of the plane portion P of the top sheet portion 12a of the hat-shaped member 12 of the hollow member 10, but the number of FRP members 20 and the joint positions are not particularly limited. For example, as illustrated in FIG. 6, the FRP members 20 may be joined to the vertical wall portions 12b of the hat-shaped member 12. Also in this case, FRP joint portions of the vertical wall portions 12b each function as a simple support point functions, thereby enabling the improvement in the weight efficiency of the impact resistance. Further, for example, the respective FRP members 20 may be joined to the flat sheet 11, the plane portion P of the top sheet portion 12a, and the plane portions P of the vertical wall portions 12b. On the other hand, the FRP member 20 need not be provided in plurality. That is, the FRP member 20 only needs to be joined so as to be along the longitudinal direction L of the hollow member 10 to at least one section of the plane portions P of the hollow member 10.

Figure 7:
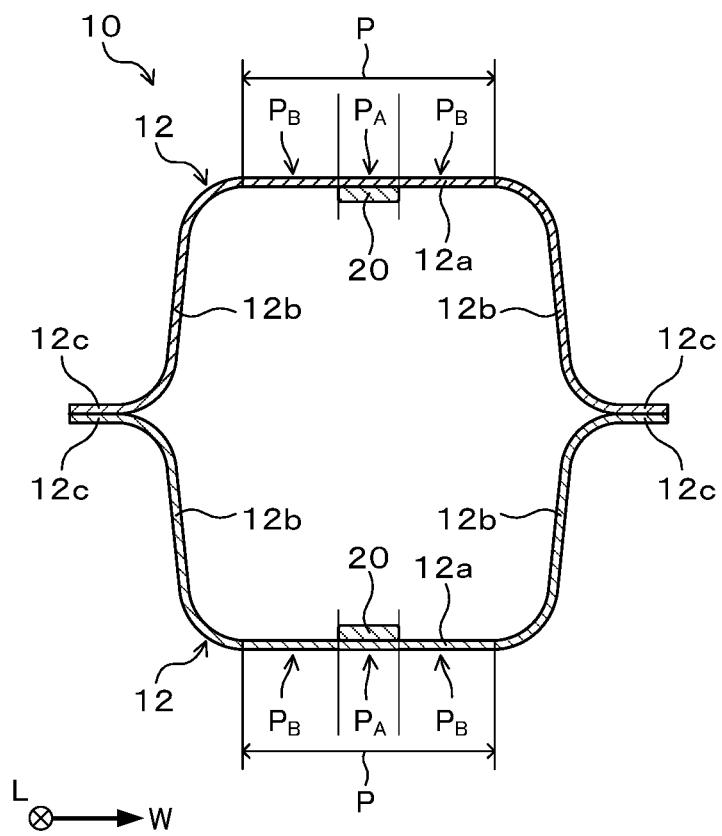
FIG. 7 is a sectional view illustrating a schematic configuration of a structural member according to the other embodiment of the present invention.

Further, in the above-described embodiment, the hollow member 10 is formed of the flat sheet 11 and the hat-shaped member 12, but for example, when the structural member 1 is the floor cross member, the flat sheet 11 may be a floor panel. In this case, the hollow member 10 is manufactured by joining the hat-shaped member 12 to the floor panel. Further, for example, as illustrated in FIG. 7, the hollow member 10 may be formed of the two hat-shaped members 12. That is, the formation of the hollow member 10 is not particularly limited.

Further, in the above-described embodiment, the FRP members 20 are joined to the inner surface of the hollow member 10, but the FRP member 20 may be joined to an outer surface of the hollow member 10. However, as long as the FRP member 20 is joined to the inner surface of the hollow member 10, a vehicle interior space does not become small even though the thickness of the FRP member 20 is increased. Accordingly, in order to improve the weight efficiency of the impact resistance, and further secure the vehicle interior space, the FRP member 20 is preferably joined to the inner surface of the hollow member 10. In addition, because the FRP member 20 normally has a higher strength related to tensile deformation than a strength related to compressive deformation, joining it on the inner surface side of the hollow member 10 relatively susceptible to the tensile deformation allows the weight efficiency of the impact resistance to be further improved.

In addition, in the above-described embodiment, the explanation has been made that the FRP member 20 is composed of, for example, the CFRP (carbon fiber reinforced plastic), and the technique of the present invention is applicable to constitution using the FRP members 20 composed of various FRPs. That is, as the member joined to the plane portion P of the hollow member 10, a GFRP member composed of a GFRP (glass fiber reinforced plastic) may be used as the FRP member 20. Also in this case, it is possible to enjoy the effect similar to that of the above-described embodiment. That is, the member joined to the plane portion P of the hollow member 10 only needs to be the FRP member composed of the FRP (fiber reinforced plastic). From the viewpoints of the reduction in weight and improvement in specific rigidity, it is important to use the FRP member, and in particular, the CFRP member is more preferable. Hereinafter, the composition and the joining method of the FRP member will be explained.

<Kind of FRP Member>

The FRP member capable of being used as a reinforcing member means a fiber-reinforced resin member composed of a matrix resin and a reinforced fiber material contained in the matrix resin to be composite therewith.

As the reinforced fiber material, for example, carbon fibers or glass fibers can be used. Besides, as the reinforced fiber material, boron fibers, silicon carbide fibers, aramid fibers, or the like can be used. In the FRP used for the FRP member, as a reinforced fiber base material serving as a base material of the reinforced fiber material, for example, a nonwoven fabric base material using chopped fibers, a cloth material using continuous fibers, a unidirectional reinforced fiber base material (UD material), or the like can be used. These reinforced fiber base materials can be appropriately selected according to the necessity for orientation of the reinforced fiber material. In order to further increase the weight efficiency of the impact resistance, it is more desirable that the unidirectional reinforced fiber base material (UD material) is used and the direction of the fibers is aligned in a range of not less than −5° nor more than 5° with a longitudinal direction of the fiber-reinforced resin member.

The CFRP member is the FRP member using the carbon fibers as the reinforced fiber material. As the carbon fibers, for example, PAN-based ones or pitch-based ones can be used. Using the carbon fibers allows the strength with respect to the weight, or the like to be efficiently improved. In order to enhance the flexural rigidity of the CFRP member, a volume fraction in which the direction of the (carbon) fibers is in a range of not less than −5° nor more than 5° (±5°) is preferably 80% or more, 90% or more, or 95% or more of all the (carbon) fibers. The direction of the (carbon) fibers can be identified by observing the fiber-reinforced resin member with a microfocus X-ray CT (X-ray computed tomograph) system and analyzing the obtained three-dimensional image with a computer. When fiber diameters of the CFRP are the same in the observation with the X-ray CT system, a ratio of the number of fibers is the volume fraction. When fiber diameters of the CFRP are different in the observation with the X-ray CT system, a volume ratio can be calculated from a CFRP cross-sectional area calculated from the fiber diameters of the CFRP and a ratio of the number of fibers per the CFRP cross-sectional area.

The GFRP member is the FRP member using the glass fibers as the reinforced fiber material. The glass fibers are inferior in a mechanical property to the carbon fibers, but can suppress electrolytic corrosion of a metal member.

As the matrix resin used for the FRP member, either of a thermosetting resin and a thermoplastic resin can be used. As the thermosetting resin, there can be cited an epoxy resin, an unsaturated polyester resin, a vinylester resin, and the like.

As the thermoplastic resin, there can be cited polyolefin (polyethylene, polypropylene, or the like) and an acid-modified product thereof, a polyamide resin such as nylon 6 and nylon 66, thermoplastic aromatic polyester such as polyethylene terephthalate and polybutyrene terephthalate, polycarbonate, polyethersulfone, polyphenyleneether and a modified product thereof, a styrene-based resin such as polyarylate, polyetherketone, polyetheretherketone, polyetherketoneketone, vinyl chloride, or polystyrene, a phenoxy resin, and the like. Note that the matrix resin may be formed of a plurality of kinds of resin materials.

In consideration of application to the metal member, from the viewpoints of workability and productivity, the thermoplastic resin is preferably used as the matrix resin. Moreover, using the phenoxy resin as the matrix resin allows density of the reinforced fiber material to be increased. Further, the phenoxy resin has heat resistance nearly equal to that of the epoxy resin because a molecular structure thereof closely resembles that of the epoxy resin being the thermosetting resin. In addition, further adding a curing component also enables application to a high-temperature environment. When the curing component is added, its addition amount only needs to be appropriately determined in consideration of impregnating ability into the reinforced fiber material, brittleness of the FRP member, tact time, workability, and the like.

<Adhesive Resin Layer>

When the reinforcing member is formed by the FRP member or the like, an adhesive resin layer may be provided between the FRP member and the metal member (the hollow member 10 in the above-described embodiment) to join the FRP member and the metal member by using the adhesive resin layer.

The kind of adhesive resin composition forming the adhesive resin layer is not particularly limited. For example, the adhesive resin composition may be either of the thermosetting resin and the thermoplastic resin. The kinds of the thermosetting resin and the thermoplastic resin are not particularly limited. For example, as the thermoplastic resin, there can be used one or more kinds selected from polyolefin and an acid-modified product thereof, polystyrene, polymethyl methacrylate, an AS resin, an ABS resin, thermoplastic aromatic polyester such as polyethylene terephthalate or polybutyrene terephthalate, polycarbonate, polyimide, polyamide, polyamide-imide, polyetherimide, polyethersulfone, polyphenyleneether and a modified product thereof, polyphenylene sulfide, polyoxymethylene, polyarylate, polyetherketone, polyetheretherketone, polyetherketoneketone, and the like. Further, as the thermosetting resin, for example, there can be used one or more kinds selected from an epoxy resin, a vinylester resin, a phenolic resin, and a urethane resin.

The adhesive resin composition can be appropriately selected according to properties of the matrix resin composing the FRP member, properties of the reinforcing member, or properties of the metal member. For example, a resin having a functional group with polarity or a resin subjected to acid modification or the like is used as the adhesive resin layer, thereby improving adhesion properties.

Thus, the FRP member is bonded to the metal member by using the above-mentioned adhesive resin layer, thereby allowing adhesiveness between the FRP member and the metal member to be improved. Thus, it is possible to improve deformation followability of the FRP member when a load is input to the metal member. In this case, it becomes possible to more securely exhibit the effect of the FRP member with respect to a deformable body of the metal member.

Note that a form of the adhesive resin composition used for forming the adhesive resin layer can be, for example, powder, a liquid such as varnish, or a solid such as a film.

Further, by mixing a crosslinking curable resin and a crosslinking agent with the adhesive resin composition, the crosslinkable adhesive resin composition may be formed. This improves heat resistance of the adhesive resin composition, which thus enables the application under a high-temperature environment. As the crosslinking curable resin, for example, a bifunctional or higher epoxy resin or a crystalline epoxy resin can be used. Further, as the crosslinking agent, an amine, an acid anhydride, or the like can be used. In addition, with the adhesive resin composition, other additives such as various kinds of rubber, an inorganic filler, and a solvent may be mixed in a range not to impair its adhesion properties and physical properties.

The FRP member being composite with the metal member can be achieved by various methods. For example, the FRP or a prepreg for FRP molding being a precursor thereof which serves as the FRP member, and, the metal member are bonded by the above-mentioned adhesive resin composition to solidify (or cure) the adhesive resin composition, thereby obtaining the FRP member being composite with the metal member. In this case, for example, performing thermocompression bonding allows the FRP member and the metal member to be made composite with each other.

The bonding of the above-mentioned FRP or prepreg for FRP molding to the metal member can be performed before molding of parts, during molding thereof, or after molding thereof. For example, after molding a metallic material being a workpiece into the metal member, the FRP or the prepreg for FRP molding may be bonded to the metal member. Further, after bonding the FRP or the prepreg for FRP molding to the workpiece by the thermocompression bonding, the workpiece to which the FRP member is bonded may be molded to obtain the metal member being composite therewith. As long as the matrix resin of the FRP member is the thermoplastic resin, a portion to which the FRP member is bonded can also be subjected to molding such as bending. In addition, when the matrix resin of the FRP member is the thermoplastic resin, composite integrated molding in which a thermocompression bonding process and a molding process are integrated may be performed.

Note that the joining method of the FRP member and the metal member is not limited to the bonding by using the above-mentioned adhesive resin layer. For example, the FRP member and the metal member may be mechanically joined. More concretely, fastening holes may be formed in positions where the FRP member and the metal member correspond to each other to join the FRP member and the metal member by fastening them through the holes by a fastening means such as bolts or rivets. Besides, the FRP member and the metal member may be joined by well-known joining means. Further, the FRP member and the metal member may be joined in a complex manner by a plurality of joining means. For example, the bonding by using the adhesive resin layer and the fastening by the fastening means may be used in a complex manner.

<Metal Member and Surface Treatment Thereof>

The metal member according to the present invention may be plated. This improves corrosion resistance. In particular, when the metal member is a steel material, plating is more suitable. The kind of plating is not particularly limited, and well-known plating can be used. For example, as a plated steel sheet (steel material), there can be used a hot-dip galvanized steel sheet, a hot-dip alloyed galvanized steel sheet, a Zn—Al—Mg-based alloy plated steel sheet, an aluminum-plated steel sheet, an electrogalvanized steel sheet, an electric Zn—Ni-based alloy plated steel sheet, or the like.

Further, the metal member may be covered on its surface by a coat called conversion treatment. This further improves the corrosion resistance. As the conversion treatment, generally well-known conversion treatment can be used. For example, as the conversion treatment, there can be used zinc phosphate treatment, chromate treatment, chromate-free treatment, or the like. Further, the above-described coat may be a well-known resin coat.

Further, the metal member may be subjected to generally well-known coating. This further improves the corrosion resistance. As the coating, well-known resins can be used. For example, as the coating, there can be used coating in which an epoxy resin, a urethane resin, an acrylic resin, a polyester resin, a fluorine-based resin, or the like is used as a main resin. Further, for the coating, as needed, generally well-known pigments may be added. In addition, the coating may be clear coating in which the pigment is not added. Such coating may be performed on the metal member in advance before being composite with the FRP member, or may be performed on the metal member after being composite with the FRP member. Further, after performing the coating on the metal member in advance, the FRP member may be composite therewith to thereafter further perform the coating. A coating material used for the coating may be a solvent-based coating material, a water-based coating material, a powder coating material, or the like. As an execution method of the coating, generally well-known methods can be applied. For example, as the execution method of the coating, there can be used electrodeposition coating, spray coating, electrostatic coating, dip coating, or the like. Because the electrodeposition coating is suitable for covering an end face and a gap portion of the metal member, it is excellent in corrosion resistance after coating. In addition, the generally well-known conversion treatment such as zinc phosphate treatment or zirconia treatment is performed on the surface of the metal member before coating, thereby improving coating film adhesiveness.

Examples

<Crash Simulation (A)>

Figure 8:
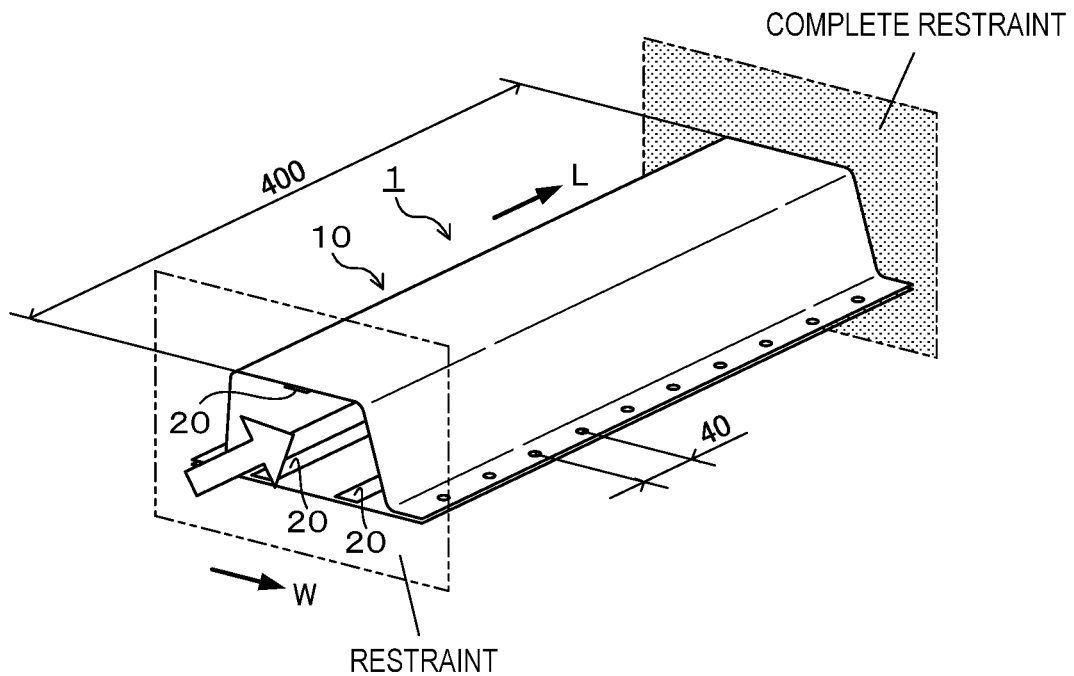
FIG. 8 is a perspective view illustrating an analysis model in a crash simulation (A).
Figure 9:
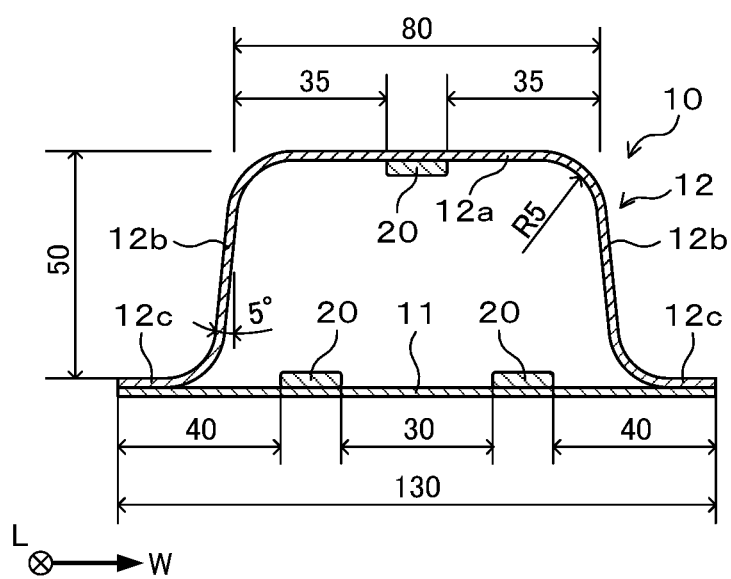
FIG. 9 is a view illustrating joint positions of FRP members in the crash simulation (A).

In order to evaluate the structural member according to the present invention, an analysis model illustrated in FIG. 8 and FIG. 9 was prepared to carry out a crash simulation (A). A structural member 1 of the analysis model is constituted of a hollow member 10 formed of a flat sheet 11 and a hat-shaped member 12 and FRP members 20 composed of a CFRP. The flat sheet 11 and the hat-shaped member 12 are spot-welded at flange portions 12c of the hat-shaped member 12, and an interval between spots is 40 mm. A sheet thickness of the flat sheet 11 and the hat-shaped member 12 is 1.0 mm, and a yield stress thereof is 700 Mpa. The FRP members 20 are joined at two sections on an inner surface of the flat sheet 11 and one section on an inner surface of a plane portion of a top sheet portion 12a of the hat-shaped member 12. An end portion in a width direction W of each of the two FRP members 20 joined to the inner surface of the flat sheet 11 is at a position of 40 mm from each of end portions in the width direction W of the flat sheet 11, and an interval between the FRP members 20 is 30 mm. End portions in the width direction W of the FRP member 20 joined to the top sheet portion 12a are at positions of 35 mm from a pair of opposing vertical wall portions 12b. In addition, the FRP members 20 are joined continuously across from one end to the other end in a longitudinal direction L of the hollow member 10.

In the crash simulation (A), one end face of the above-described analysis model is completely constrained, and the other end face is constrained so that in-plane deformation does not occur while permitting displacement in the longitudinal direction L of the hollow member 10. In a subsequent explanation, the end face on the completely constrained side is called a completely constrained-side end face, and the end face on the opposite side is called a non-completely constrained-side end face. Under such a constraint condition, the crash simulation (A) was carried out under the condition of compressing the end face on the non-completely constrained side by 10 mm in the longitudinal direction of the hollow member 10. A crash speed was set to 3 m/s and an element size was set to 1 mm at that time, and a crash analysis was carried out by nonlinear structural analysis software LS-DYNA.

Figure 10:
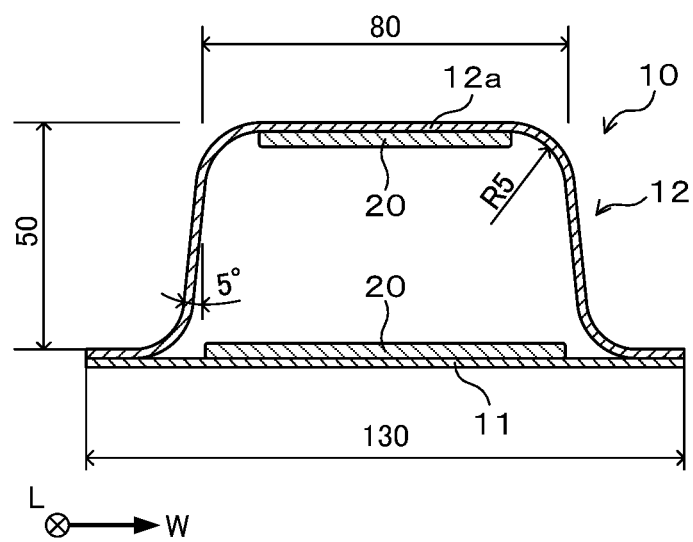
FIG. 10 is a view illustrating joint positions of FRP members in the crash simulation (A).
Figure 11:
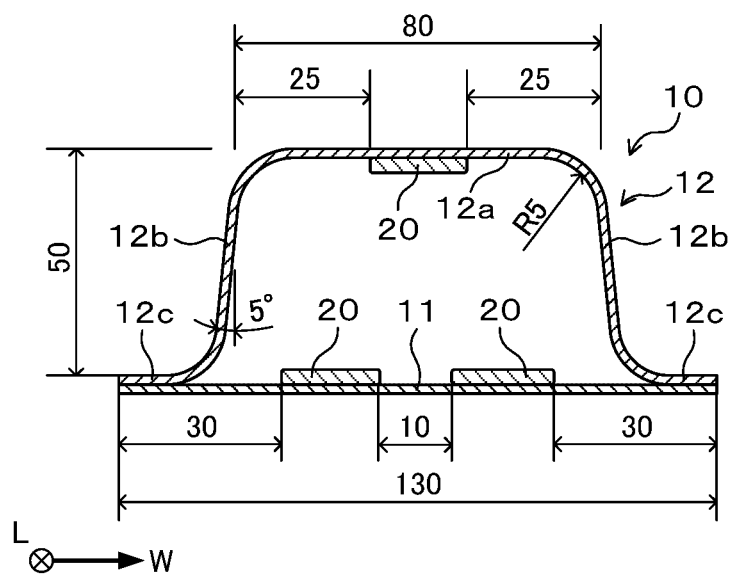
FIG. 11 is a view illustrating joint positions of FRP members in the crash simulation (A).
Figure 12:
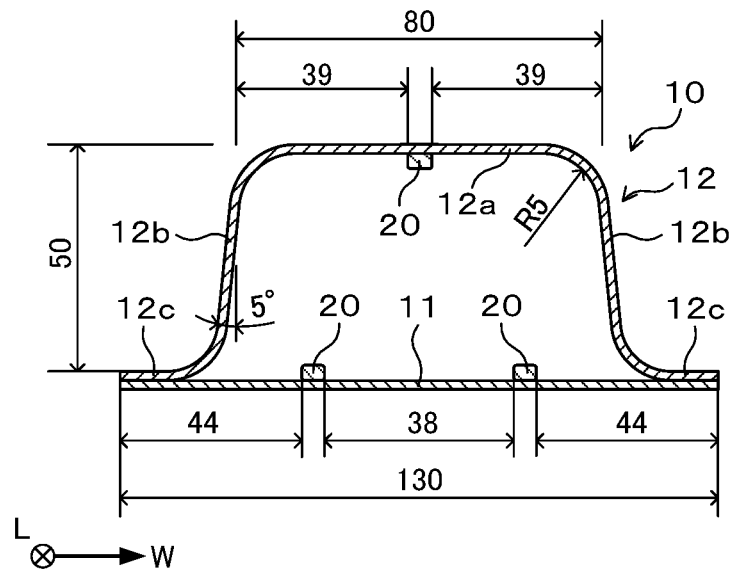
FIG. 12 is a view illustrating joint positions of FRP members in the crash simulation (A).

Note that the crash simulation (A) was carried out by using a plurality of analysis models different in thicknesses of the FRP members 20. Thicknesses of the respective FRP members 20 used for the one analysis model are equal to each other. Further, as comparative examples, the analysis model not provided with the FRP member 20 in contrast to the structural member 1 illustrated in FIG. 9 (Comparative example 1) and the analysis model in which FRP members 20 were joined to the entire inner surface of a flat sheet 11 and to the entire inner surface of a plane portion of a top sheet portion 12a as illustrated in FIG. 10 (Comparative example 2) were prepared to carry out the crash simulation (A) by using the respective analysis models. Note that a width of the FRP member is set to 10 mm in FIG. 9, but widths of FRP members in Example 7 and Comparative example 4 are 30 mm and 2 mm respectively as illustrated in FIG. 11 and FIG. 12 (refer to Table 1). A full width of 130 mm of each of plane portions P in Example 7 and Comparative example 4 is the same as that in FIG. 9, and a middle position of pasting the FRP member in FIG. 9 is the same. The fibers in which a direction of the fibers of the FRP member was within ±5° (in a range of −5° to)+5° in the longitudinal direction of the FRP member were 80% or more of all the fibers in volume fraction excluding Comparative example 1 in which there was no FRP member.

The following Table 1 presents results of the crash simulation (A). In this simulation, a maximum reaction force generated when the non-completely constrained-side end face was compressed was measured. Because the maximum reaction force is correlated with buckling strength, it becomes an index for evaluating impact resistance. Further, a maximum reaction force/weight was calculated as an index of evaluating weight efficiency of the impact resistance, and ratios of the weight efficiency in the respective examples to the weight efficiency in Comparative example 1 in which the FRP member was not provided were calculated. Further, flexural rigidity of a single body of the FRP member in an FRP joint portion and flexural rigidity of the plane portion P in the FRP joint portion at any one section in the structural member were each calculated, to calculate a ratio between both (flexural rigidity ratio). Further, a "total width of FRP joint portion $P_A$/full width of plane portion P×100" was defined as a value (unit: %) as a "PA portion width/plane portion width", and this value was calculated in the respective portions such as the flat sheet 11 and the top sheet portion 12a in each of the examples and comparative examples, where FRP joint portions and FRP non-joint portions were mixed. In addition, in consideration of the condition of the formula (1) explained in the above-described embodiment, a value α represented in the following formula (3) was defined, and this value α (unit: %) was calculated in the respective portions such as the flat sheet 11 and the top sheet portion 12 in each of the examples and comparative examples. Note that when the values of α in Table 1 are related to FIG. 9, the value in the top sheet portion 12a and the values at three sections of the flat sheet 11 are indicated.

[Mathematical formula 4]

$$\alpha = \text{WIDTH } D \text{ OF } FRP \text{ NON-JOINT PORTION } PB/1.9 \times t \times \sqrt{\frac{E}{\sigma y}} \times 100 \quad (3)$$

TABLE 1

| | FRP MEMBER | | | MAXIMUM REACTION FORCE [kN] | RATIO OF MAXIMUM REACTION FORCE/ WEIGHT USING COMPARATIVE EXAMPLE 1 | FLEXURAL RIGIDITY RATIO IN FRP JOINT PORTION | PA PORTION WIDTH/ PLANE PORTION WIDTH [%] | α [%] |
|---|---|---|---|---|---|---|---|---|
| | JOINT POSITION | WIDTH [mm] | THICKNESS [mm] | | | | | |
| COMPARATIVE EXAMPLE 1 | — | — | — | 107 | 1.00 | — | TOP SHEET, FLAT SHEET = 0, 0 | TOP SHEET, FLAT SHEET = 215, 399 |
| COMPARATIVE EXAMPLE 2 | FIG. 10 | TOP SHEET PORTION SIDE 70 FLAT SHEET SIDE 80 | 2 | 122 | 0.98 | 4.3 | 100, 62 | 0, 77 |
| COMPARATIVE EXAMPLE 3 | FIG. 9 | 10 | 2 | 110 | 1.00 | 4.3 | 14, 15 | 92, (123, 77, 123) |
| EXAMPLE 1 | FIG. 9 | 10 | 4 | 123 | 1.07 | 34 | 14, 15 | 92, (123, 77, 123) |

TABLE 1-continued

| | FRP MEMBER | | | MAXIMUM REACTION FORCE [kN] | RATIO OF MAXIMUM REACTION FORCE/ WEIGHT USING COMPARATIVE EXAMPLE 1 | FLEXURAL RIGIDITY RATIO IN FRP JOINT PORTION | PA PORTION WIDTH/ PLANE PORTION WIDTH [%] | α [%] |
|---|---|---|---|---|---|---|---|---|
| | JOINT POSITION | WIDTH [mm] | THICKNESS [mm] | | | | | |
| EXAMPLE 2 | FIG. 9 | 10 | 6 | 161 | 1.37 | 115 | 14, 15 | 92, (123, 77, 123) |
| EXAMPLE 3 | FIG. 9 | 10 | 8 | 177 | 1.46 | 273 | 14, 15 | 92, (123, 77, 123) |
| EXAMPLE 4 | FIG. 9 | 10 | 10 | 194 | 1.56 | 534 | 14, 15 | 92, (123, 77, 123) |
| EXAMPLE 5 | FIG. 9 | 10 | 20 | 232 | 1.63 | 4270 | 14, 15 | 92, (123, 77, 123) |
| EXAMPLE 6 | FIG. 9 | 10 | 40 | 370 | 2.09 | 34200 | 14, 15 | 92, (123, 77, 123) |
| EXAMPLE 7 | FIG. 11 | 30 | 7 | 210 | 1.48 | 10137 | 43, 46 | 61, (77, 31, 77) |
| COMPARATIVE EXAMPLE 4 | FIG. 12 | 2 | 20 | 115 | 1.00 | 4270 | 3, 3 | 120, (135, 117, 135) |

According to the above-described Table 1, in Comparative example 2 of the structural member in which the FRP members 20 are joined over the plane portions of the hollow member 10, the flexural rigidity is improved, but the weight efficiency is decreased more than that of the structural member in Comparative example 1 in which the FRP member 20 is not provided. The cause of such a result is because there is no portion which functions as a simple support point functions at a middle portion of the plane portion. In a detailed explanation, by joining the FRP member 20 over the plane portion, width direction end portions of the FRP joint portion each approach a simple support state, but a width direction middle portion of the plane portion is not in the simple support state, and is a portion still not contributing to the buckling strength. For this reason, as much impact resistance as corresponds to an increase in weight cannot be obtained.

On the other hand, in Examples 1 to 7, the weight efficiency with respect to that in Comparative example 1 is increased. In consideration of the results of this simulation, the weight efficiency can be improved when the flexural rigidity ratio is 30 or more. In particular, when the FRP member 20 having a thickness six times or more a sheet thickness (1.0 mm) of the flat sheet and the hat-shaped member is joined, the weight efficiency is significantly increased.

<Crash Simulation (B)>

Figure 13:
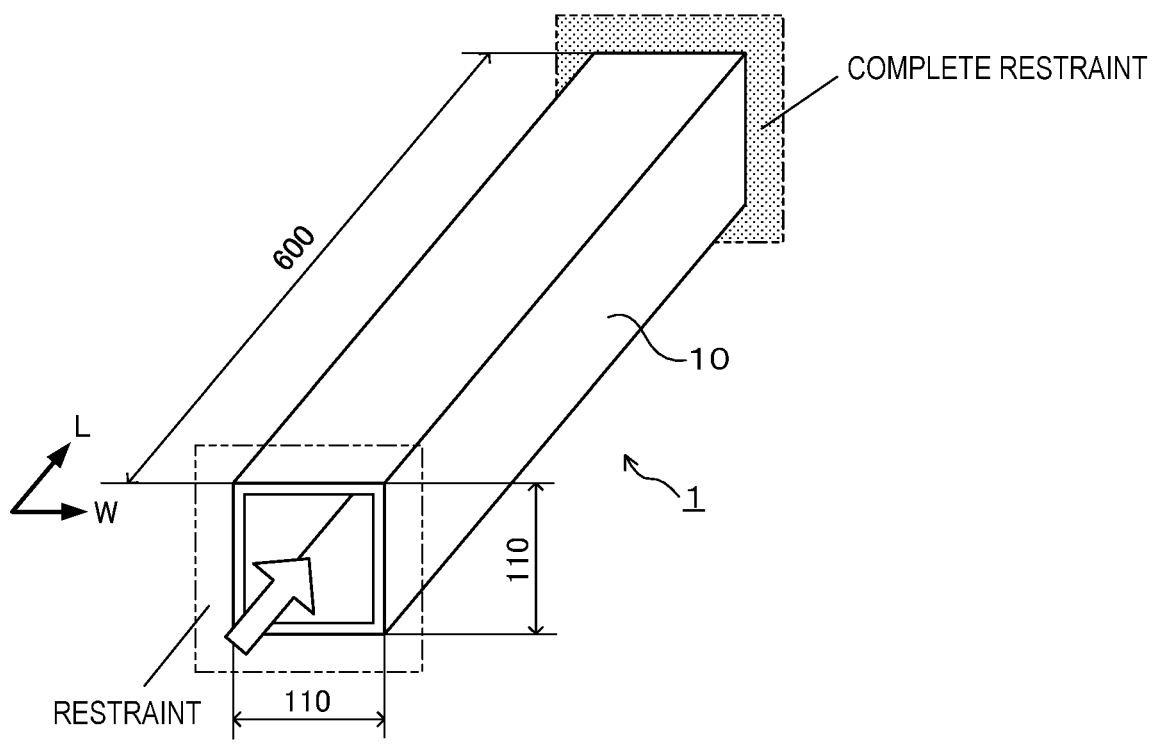
FIG. 13 is a perspective view illustrating an analysis model in a crash simulation (B).

Next, an analysis model illustrated in FIG. 13 was prepared to carry out a crash simulation (B). A structural member 1 of the analysis model is constituted of a square tube being a hollow member 10, and FRP members composed of a CFRP are joined to an inner surface of the square tube. A sheet thickness of the square tube is 1.0 mm, and a yield stress thereof is 700 MPa.

In the crash simulation (B), similarly to the above-mentioned crash simulation (A), one end face of the analysis model is set as a completely constrained-side end face, and the other end face is set as a non-completely constrained-side end face. Under such a constraint condition, the crash simulation (B) was carried out under the condition of compressing the end face on the non-completely constrained side by 20 mm in a longitudinal direction of the hollow member 10. A crash speed was set to 3 m/s and an element size was set to 1 mm at that time, and a crash analysis was carried out by the nonlinear structural analysis software LS-DYNA.

Note that the crash simulation (B) was carried out by using a plurality of analysis models in which joint positions of FRP members 20 were different as in FIG. 14 to FIG. 20. Thicknesses of the respective FRP members 20 used for the one analysis model are equal to each other. Further, as a comparative example, the analysis model not provided with the FRP member 20 in the structural member illustrated in FIG. 14 (Comparative example 5) was prepared to carry out the crash simulation (B), and the analysis model of the structural member illustrated in FIG. 20 was prepared to carry out the crash simulation (B). The fibers in which a direction of the fibers of the FRP member in Examples 9 and 10 was within ±5° in the longitudinal direction of the FRP member were 80% of all the fibers in volume fraction, and the fibers in which a direction of the fibers of the FRP member in Comparative examples 5 and 6, and Examples 8, 11 to 13 was within ±5° in the longitudinal direction of the FRP member were 100% of all the fibers in volume fraction.

The following Table 2 presents results of the crash simulation (B). Note that regarding a value of "PA portion width/plane portion width" and a value α in Table 2, these values were calculated in the respective portions where FRP joint portions and FRP non-joint portions were mixed.

TABLE 2

Figure 14:
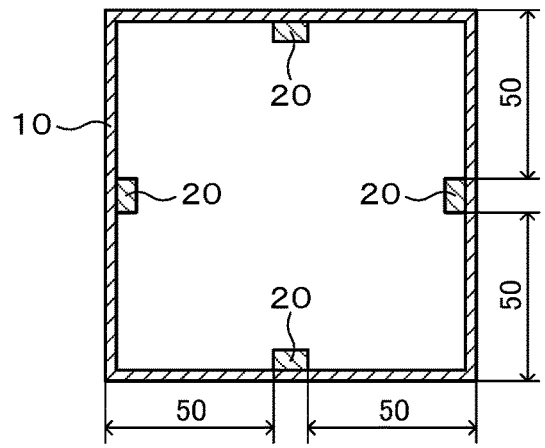
FIG. 14 is a view illustrating joint positions of FRP members in the crash simulation (B).
Figure 15:
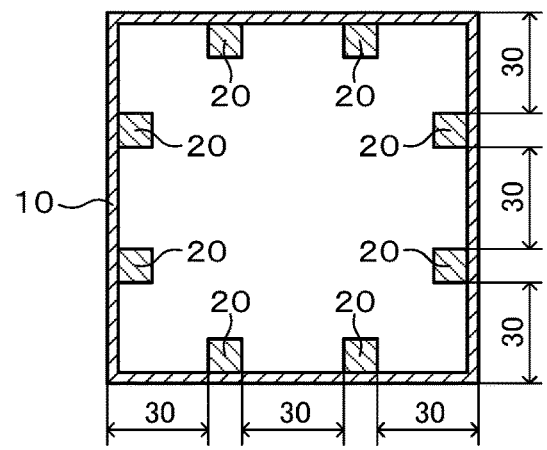
FIG. 15 is a view illustrating joint positions of FRP members in the crash simulation (B).
Figure 16:
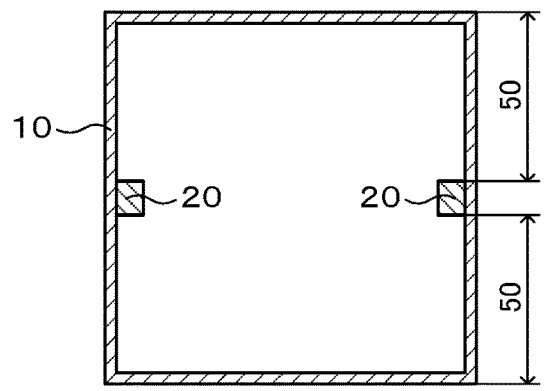
FIG. 16 is a view illustrating joint positions of FRP members in the crash simulation (B).

| | FRP MEMBER | | | RATIO OF MAXIMUM REACTION FORCE/WEIGHT USING COMPARATIVE EXAMPLE 5 | FLEXURAL RIGIDITY RATIO IN FRP JOINT PORTION | PA PORTION WIDTH/PLANE PORTION WIDTH [%] | α [%] |
|---|---|---|---|---|---|---|---|
| | JOINT POSITION | WIDTH [mm] | THICKNESS [mm] | | | | |
| COMPARATIVE EXAMPLE 5 | — | — | — | 1.00 | — | 0 | 337 |
| EXAMPLE 8 | FIG. 14 | 10 | 6 | 1.58 | 115 | 9 | 153 |
| EXAMPLE 9 | FIG. 15 | 10 | 10 | 2.61 | 534 | 18 | 92 |
| EXAMPLE 10 | FIG. 16 | 10 | 8 | 1.15 | 273 | 9 | 153 |

TABLE 2-continued

Figure 17:
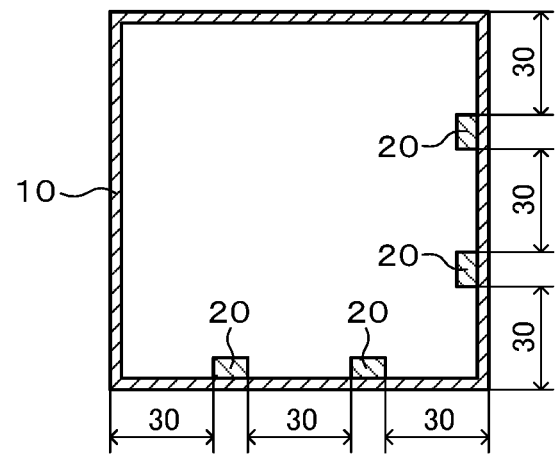
FIG. 17 is a view illustrating joint positions of the FRP members in the crash simulation (B).
Figure 18:
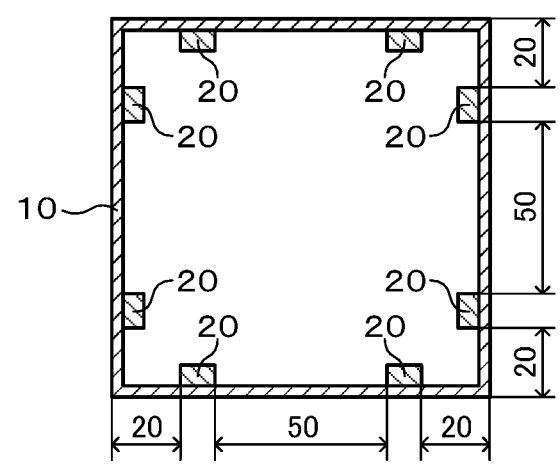
FIG. 18 is a view illustrating joint positions of the FRP members in the crash simulation (B).
Figure 19:
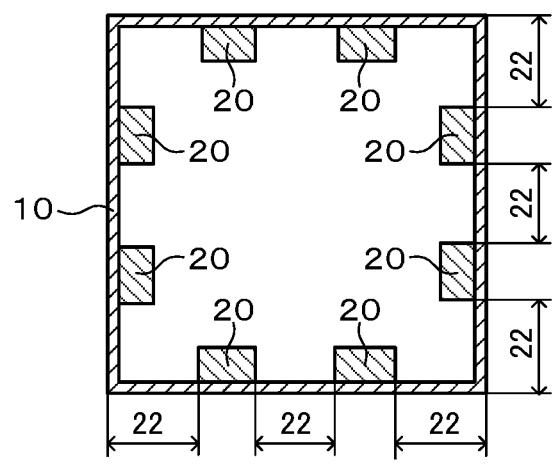
FIG. 19 is a view illustrating joint positions of FRP members in the crash simulation (B).
Figure 20:
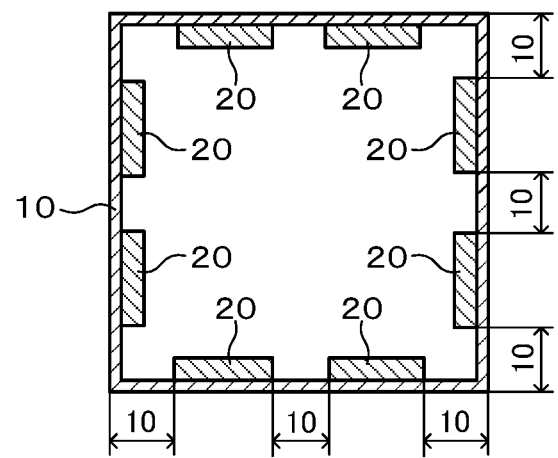
FIG. 20 is a view illustrating joint positions of FRP members in the crash simulation (B).

| | FRP MEMBER | | | RATIO OF MAXIMUM REACTION FORCE/WEIGHT USING COMPARATIVE EXAMPLE 5 | FLEXURAL RIGIDITY RATIO IN FRP JOINT PORTION | PA PORTION WIDTH/PLANE PORTION WIDTH [%] | α [%] |
|---|---|---|---|---|---|---|---|
| | JOINT POSITION | WIDTH [mm] | THICKNESS [mm] | | | | |
| EXAMPLE 11 | FIG. 17 | 10 | 6 | 1.21 | 115 | 18 | 92 |
| EXAMPLE 12 | FIG. 18 | 10 | 6 | 1.72 | 115 | 18 | 61, 153 |
| EXAMPLE 13 | FIG. 19 | 22 | 10 | 1.83 | 115 | 40 | 67 |
| COMPARATIVE EXAMPLE 6 | FIG. 20 | 40 | 2 | 1.05 | 4.3 | 73 | 31 |

As presented in Table 2, in the structural members in Examples 8 to 13 in each of which the FRP members 20 are joined, in contrast to the structural member in Comparative example 5 in which the FRP member 20 is not provided, weight efficiency is significantly improved. Further, as presented by the comparison result between Example 8 and Example 11, when the same number of FRP members 20 is used, providing the respective FRP members 20 on plane portions opposing to each other enables improvement in the weight efficiency. Further, as presented by the comparison result between Example 8 and Example 12, increasing the FRP member 20 provided in the same plane portion enables the improvement in the weight efficiency. This is because a section approaching a simple support state is increased to increase a range of an effective width in the same plane portion.

When Example 12 was compared with Example 9, regardless of the same number of FRP members 20, the weight efficiency of the impact resistance was larger in Example 9. The reason why such a difference occurs is in that an interval between the adjacent FRP members 20 in the middle portion of a plane portion is smaller in Example 9, and thus the influence of an effective width is likely to extend to an FRP non-joint portion in the middle portion of the plane portion, resulting in that the FRP non-joint portion is in a state of effectively contributing to improvement in buckling strength. Accordingly, the FRP members 20 are preferably provided so that a length of the FRP non-joint portion of the plane portion is equal to or less than the effective width.

INDUSTRIAL APPLICABILITY

The present invention can be used for a floor cross member of an automobile, for example.

EXPLANATION OF CODES 1 structural member
10 hollow member
11 flat sheet
12 hat-shaped member
12a top sheet portion
12b vertical wall portion
12c flange portion
20 FRP member
30 sheet
31 support point
32 support point
b effective width
D width of FRP non-joint portion
L longitudinal direction of hollow member
P plane portion
$P_A$ FRP joint portion
$P_B$ FRP non-joint portion
W width direction of hollow member

What is claimed is:

1. An automotive structural member comprising: a hollow member having plane portions; and an FRP member joined to at least one section of the plane portions, wherein:
the FRP member is joined to a region of at least 0.1L1 to 0.9L1 of a length L1 in a longitudinal direction of the hollow member;
the plane portion is formed with an FRP joint portion being a portion to which the FRP member is joined and an FRP non-joint portion being a portion to which the FRP member is not joined, in the region of 0.1L1 to 0.9L1;
a total width of the FRP joint portion is 8 to 60% of a full width of the plane portion, in the plane portion; and
a flexural rigidity of the FRP member in the FRP joint portion is 30 times or more a flexural rigidity of the plane portion excluding the FRP member in the plane portion.

2. The automotive structural member according to claim 1, wherein a flexural rigidity of the FRP member is 100 times or more a flexural rigidity of the plane portion excluding the FRP member.

3. The automotive structural member according to claim 1, wherein a thickness of the FRP member is six times or more a thickness of the plane portion.

4. The automotive structural member according to claim 1, wherein each width D of the FRP non-joint portions in the plane portion satisfies a following formula (1),

[Mathematical formula 5]

$$0.5 \times 1.9 \times t \times \sqrt{\frac{E}{\sigma y}} \leq D \leq 1.6 \times 1.9 \times t \times \sqrt{\frac{E}{\sigma y}} \quad (1)$$

Here, t: a thickness of the plane portion, E: a Young's modulus of the plane portion, $\sigma_y$: a yield stress of the plane portion.

5. The automotive structural member according to claim 1, wherein the FRP member is joined to a surface on an inner space side of the hollow member.

6. The automotive structural member according to claim 1, wherein the FRP member is a CFRP member composed of a CFRP.

7. The automotive structural member according to claim 1, wherein the FRP member is a GFRP member composed of a GFRP.

8. The automotive structural member according to claim 6, wherein fibers in which a fiber direction of the CFRP member is in a range within ±5° to a longitudinal direction of the CFRP member are 80% or more of all fibers.

9. The automotive structural member according to claim 1 being at least any member of a floor cross member, a floor tunnel, a front side member rear, and a side sill.

\* \* \* \* \*